United States Patent

[11] 3,542,177

| [72] | Inventor | Karl Gustav Ahlen<br>Stockholm K, Sweden |
|---|---|---|
| [21] | Appl. No. | 754,788 |
| [22] | Filed | Aug. 23, 1968 |
| [45] | Patented | Nov. 24, 1970 |
| [73] | Assignee | S. R. M. Hydromekanik, A B<br>Stockholm-Vallingby, Sweden |
| [32] | Priority | Sept. 15, 1967 |
| [33] | | Great Britain |
| [31] | | No. 42099/67 |

[54] TORQUE CONVERTER CLUTCH WITH FIXED AND STATIONARY MOTORS
18 Claims, 7 Drawing Figs.

[52] U.S. Cl................................................... 192/86,
103/11, 192/106, 192/3, 192/3.33, 192/3.27,
192/113
[51] Int. Cl..................................................... F16d 25/00
[50] Field of Search........................................... 192/106F,
86, 85c-2, 3.3(Cursory) 3.33(Cursory)

[56] References Cited
UNITED STATES PATENTS

| 2,178,017 | 10/1939 | Fedden et al. ................. | 192/86 |
| 2,257,364 | 9/1941 | Bakewell ...................... | 192/86UX |
| 2,795,309 | 6/1957 | Hasbany....................... | 192/106FX |

Primary Examiner—Benjamin W. Wyche, III
Attorney—Larson, Taylor & Hinds

ABSTRACT: A friction coupling comprising friction plates normally urged apart. A first servomotor which rotates with the plates, causes engagement of the plates. A second servomotor, nonrotatably mounted and separate from the first servomotor, causes expulsion of pressure fluid from the first servomotor to permit separation of the plates. An axial thrust bearing separates the first and second servomotors. In a torque converter the servomotors are supplied with fluid from a plurality of different pressure sources.

3,542,177

TORQUE CONVERTER CLUTCH WITH FIXED AND STATIONARY MOTORS

This invention relates to a friction coupling and more particularly to a friction coupling for use with a hydraulic torque converter.

Hydraulic torque converters are in most cases combined with one (forward/reverse) or more mechanical gears. In cases where the mechanical gears have power shifts, the combination is complicated and expensive, especially for the "low gear" ratios as the release clutches are applied on the secondary side of the hydraulic torque converter, which means that the clutch or brake arrangements engaging the lowest gear must transfer a very high torque.

There is a general trend of increasing horsepower for all motive vehicles. This trend results in hydrodynamic torque converters becoming more and more attractive, as the hydrodynamic transmission or at least the hydrodynamic part of the transmission becomes smaller and smaller as compared with a mechanical transmission and the omission of peak torques to reduce the necessary strength of the drive becomes more important. The higher horsepower and the higher top speeds of the vehicle also necessitate making the hydrodynamic transmission capable of a higher and higher torque multiplication and increases the desire of producing a combination having fewer and fewer essential gears of mechanical type. In any case there is always the necessity of combining the hydrodynamic torque converter or transmission with a forward/reverse gear and one which for railway applications is often separately mounted and which for many other motive vehicle arrangements can from weight and price standpoint be made with a dog clutch shift.

The type of hydrodynamic torque converter, which is enclosed in a casing rotatably fixedly connected to the engine, has many advantages but one disadvantage, namely that when combined with a mechanical transmission at least one friction release clutch or friction brake is necessary on the secondary side of the torque converter system, which means that it has to transfer the torque multiplied by the torque converter and not merely the engine torque.

A further problem, which was not very important as long as the hydrodynamic torque converters of the type mentioned had a torque ratio of up to 2.5 to 1 was that since it was capable of carrying over the stall torque, the torque capacity of the release clutch at higher secondary speeds was clearly too high and caused the connection and the disconnection of the clutch for changing gear at higher speeds to become very rough. Recently hydrodynamic torque converter blade systems of the type mentioned having a rotating casing, and hydrodynamic transmission units with such systems have been developed, which for single blade systems have a torque ratio of up to 4.5 and for the transmission unit torque ratios up to 9. Quite obviously, to be successful the combination of such hydrodynamic torque converters with a mechanical transmission requires an exceptional performance of the clutch.

According to the present invention a friction coupling of the type actuated by pressure oil is provided with a servomotor rotating with the coupling and causing engagement of the coupling, the disengagement of the rotating servomotor being effected by a stationary servomotor acting through an axial thrust bearing.

The rotating servomotor is emptied of the operative oil when the clutch is disengaged, through vent holes covered when the friction clutch is engaged. The rotating servomotor for engaging the clutch is arranged on the primary side of the clutch so that the secondary side consists only of a shaft carrying friction plates.

The invention will be hereinafter more fully described with reference to the accompanying drawings in which.

Figure 1:
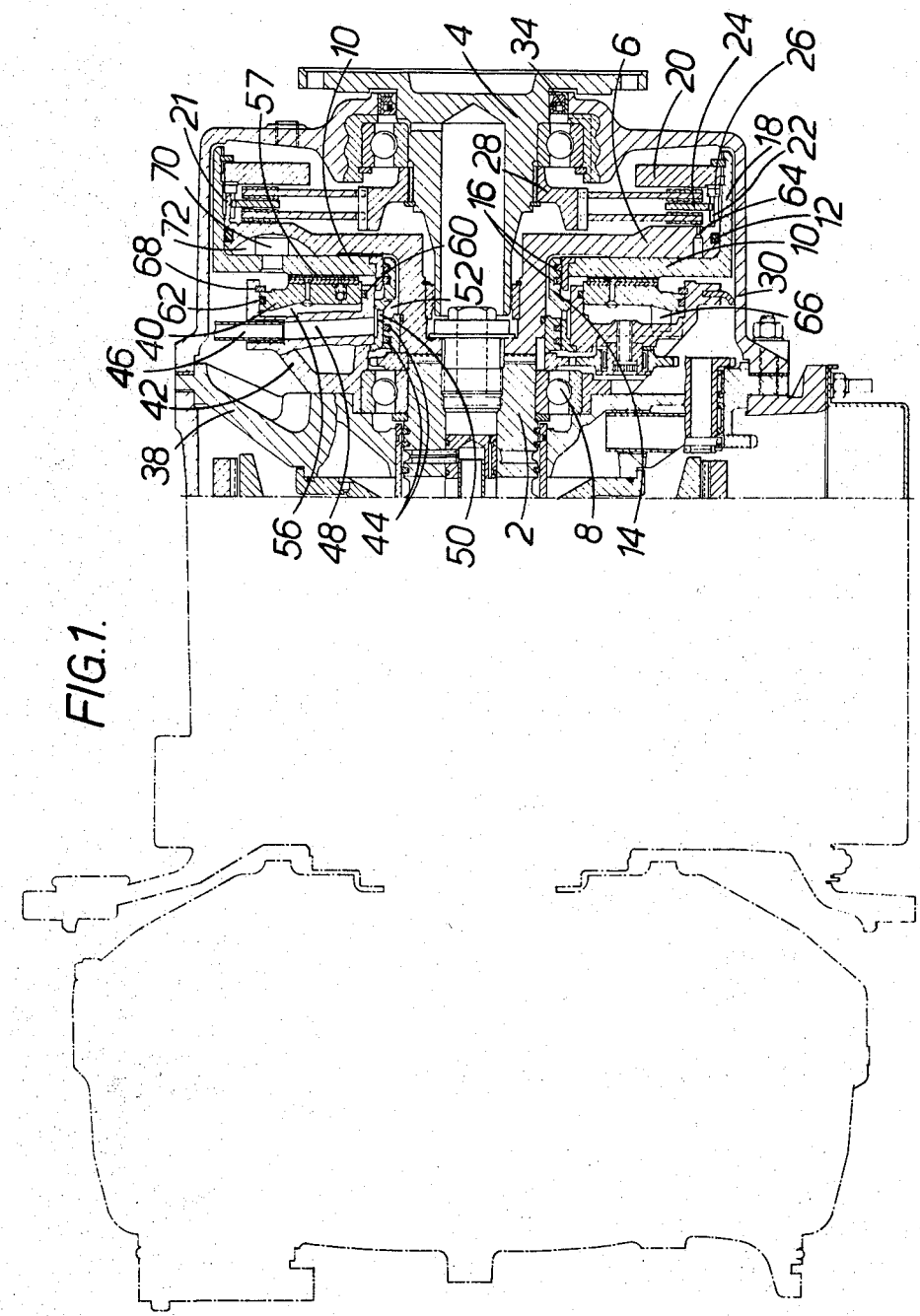
FIG. 1 shows a friction release clutch in axial section arranged on a torque converter.

FIG. 1 shows a friction release clutch mounted on a torque converter of the type having a rotating casing intended normally to be mounted directly on the engine. This torque converter may for example comprise a simple single rotation type with a feeder fluid pump normally used in such a transmission for maintaining a basic pressure in the torque converter system, to circulate fluid through this system for cooling and possibly also to supply a brake adapted to hold the reaction member stationary. The oil pressure, which the pump develops depends on a maximum pressure valve, which valve primarily for obtaining a high stall torque ratio of the torque converter is arranged, on receiving an impulse from a speed regulator, to open below a predetermined secondary shaft speed at a pressure of the order of 10 kg./cm.$^2$ and above that speed at a pressure of about 4 kg./cm.$^2$. Such an arrangement is a normal part of a torque converter of this kind.

The converter may also comprise a so-called DS transmission, giving a stall torque ratio of about 9. Such a transmission usually has one pump to supply oil for cooling the torque converter and to maintain pressure in the torque converter and a so-called high-pressure pump to supply the brake band servomotors with high oil pressure. The basic feeder fluid pump below a predetermined speed then maintains a 10 kg./cm.$^2$ pressure and above that speed about 5 kg./cm.$^2$ pressure and the high pressure pump normally maintains a pressure of up to 22 kg./cm.$^2$. In other words, three stages of oil pressure are available basically from the transmission.

Referring more particularly to FIG. 1 the input shaft to the release clutch is denoted by 2 and the output shaft 4. The shaft 2 carries an extension 6, axially fixed by a bearing 8 and rotatably fixed to the input shaft. On the member 6 a kind of piston 10 is mounted, packed against the member 6 by a seal 12 and against a stationary member 14 by a piston ring 16. This piston 10 has a cylindrical extension 18 and an annular plate 20. A servomotor is formed between the member 6 and the piston 10.

The member 6 also has a cylindrical extension 21 on the inner face of which grooves 22 are formed to engage with a friction plate 24. A spring 26 tends to separate the member 6 and the plate 20. On the output shaft 4 a hub 28 is fixed the shaft 4 being journaled in a stationary casing 30 by means of a bearing 32 and the space inside the casing being sealed to the exterior by a lip seal 34. On the hub 28 friction plates 36 are mounted extending into the space between the friction plate 24 and the member 6 and between the plate 24 and the plate 20. The casing 30 is connected by screws with an end wall 38, which contains a servomotor piston 40 disposed in a recess in a part 42, of the end wall 38. The part 42 along its inner diameter is sealed relatively to the member 6 by a piston ring 44.

Through a pipe 46, a channel 48 an aperture 50 and a space 52, pressure oil is conveyed into the chamber between the member 6 and the piston 10, so that the piston 10 with its fixedly mounted plate 20 moves to the left, reducing the space between the plate 20 and the member 6 until pressure is applied to the surfaces of 20, 36, 24, 36 and 6. The clutch is then closed to transmit torque in proportion to the oil pressure between the piston 10 and the member 6. This pressure is partly due to the pressure oil conveyed through the pipe 46 and partly due to the rotation which builds up a rotation paraboloid pressure.

To release the clutch it is necessary not only to release the oil pressure through the pipe 46, but also to overcome the rotation paraboloid, which at higher speeds is quite substantial. This problem, in this embodiment is solved in that the stationary piston 40 is forced against the piston 10 by oil pressure in the space 56, the oil entering through a pipe 54 parallel to the pipe 46 but communicating with the space 56. A surface 57 forms an axial thrust bearing surface, and this axial bearing is lubricated by oil passing through a valve 58. The piston 40 is sealed against the part 42 by the rubber rings 60 and 62. The piston 40 then moves the piston 10 to the right, until there is almost contact between piston 10 and member 6. The oil remaining in the space between the piston 10 and the member 6 is now vented through a hole 64, which at this stage is open towards the plate 36. When the clutch is closed, however, the hole 64 is covered by the plate 36.

The spring 26 keeps the piston 10 in axial contact with the member 6, as soon as there is no oil in the space intermediate the same. The piston 40 is prevented from rotating by abutments 66, bearing against a part of the member 42. The piston 40 is further prevented from continuing to exert pressure on the piston 10 by a ring 68, which permits the piston 40 to press piston 10 towards the member 6 only up to the point, where there is still an axial clearance. Blocks 70 in grooves 72 prevent the member 6 and the piston 10 from rotating relatively to each other. By this arrangement the stationary piston 10 will operate only for a limited period. The loss in the bearing has therefore no importance either from the point of view of efficiency or of heating. Further the release of the clutch is very fast, because the piston 40 creates a pressure on the fluid between the piston 10 and the member 6 to cause it to return through the pipe 48, but on the other hand when connecting the clutch, the pressure fluid between the piston 10 and the member 6 has to press oil out of the space 56, which causes only a slow increase of the force between the plate 20 and the member 6.

Figure 2:
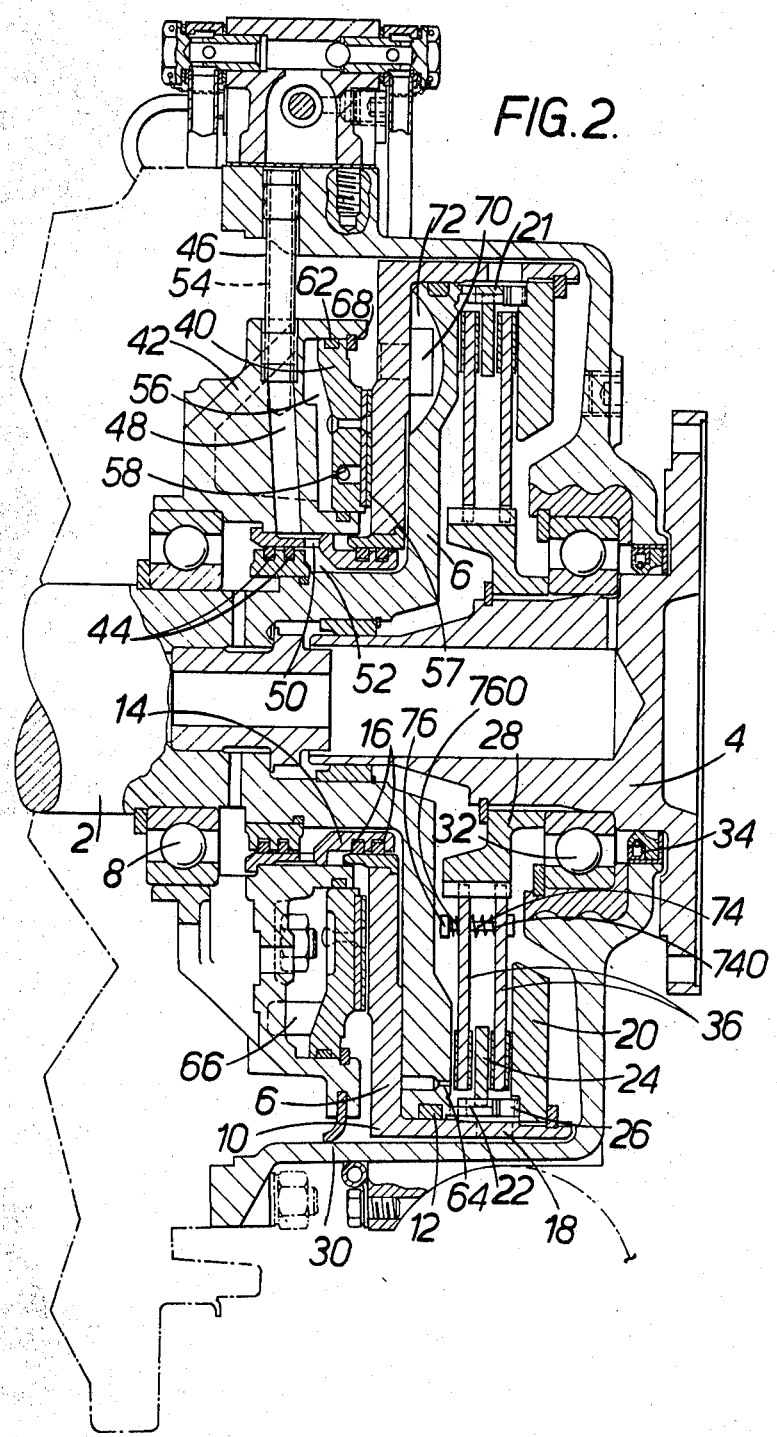
FIG. 2 shows the clutch in axial section ready for mounting on a converter.

To allow the clutch to run free without wearing the clutch plates a spacing arrangement is made for the clutch plate 24, and spacing pieces of a self-lubricating material are inserted on the plate 36, shown on FIG. 2, the spacing arrangement for the plate 24 having the member 74, and the spacers on the plate 36 having the number 76.

Figure 3:
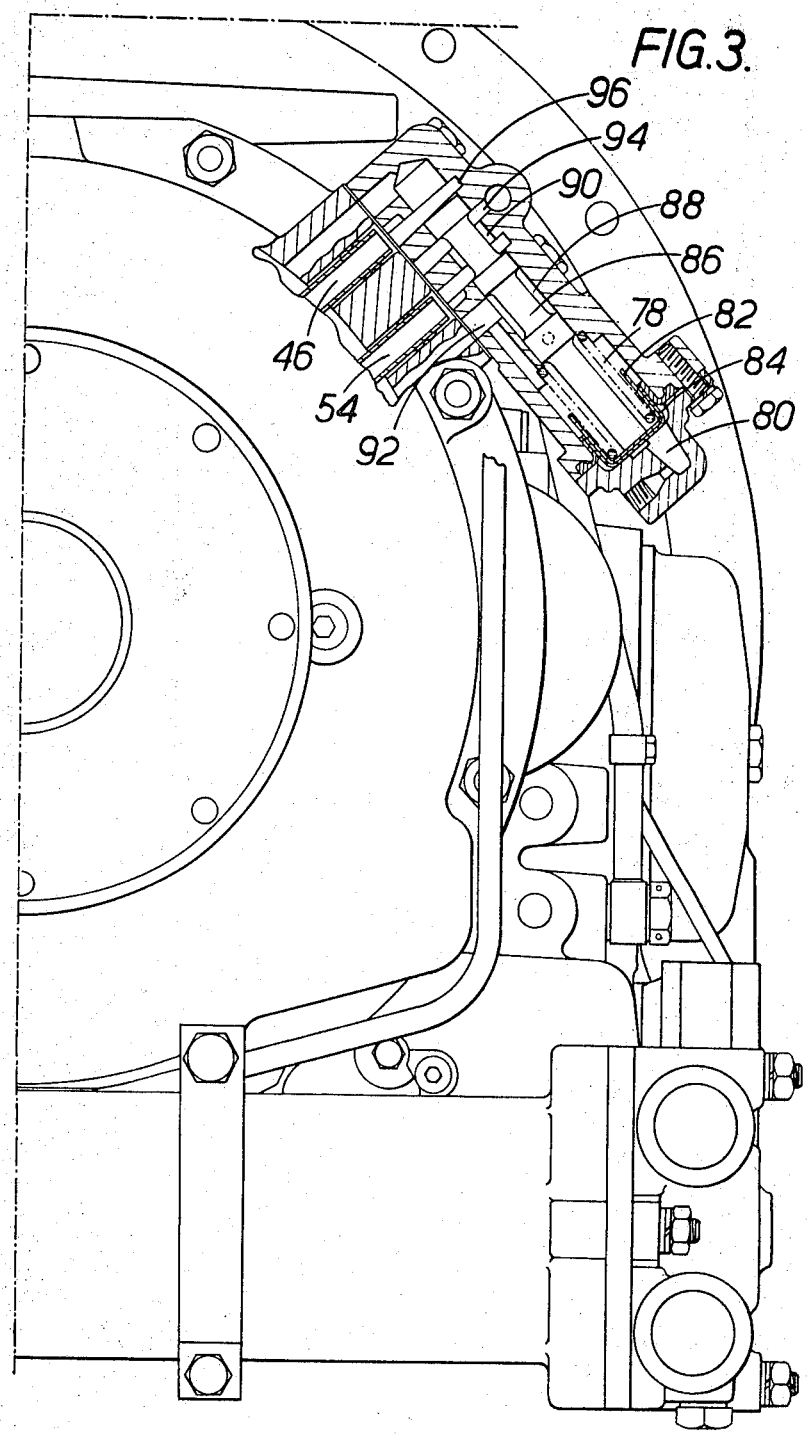
FIG. 3 shows the valve mechanism provided for connection and disconnection of the clutch.

FIG. 3 shows an axial cross section of the valve which distributes pressure oil either to the space between the piston 10 and the member 6 and venting spaces 56 or conveys pressure fluid to the space 56 and vents the space between the piston 10 and the member 6. The valve is held in the position for released clutch by a spring 78, and is moved to the position for closed clutch by air pressure in a space 80, the piston being formed by a cup 82 and a membrane 84. The piston rod 86 has recesses 88 and 90. When the clutch is released, the supply pipe 54 is shut off from the vent hole 92, and communicates with the pressure oil groove 94 through the recess 90. When the valve is in position for closed clutch, pipe 54 is vented through the recess 88 and the aperture 92. Further the pressure oil groove 94 is connected with the groove 96 through the recess 90, thereby allowing flow of oil through the pipe 46 and the space between the piston 10 and the member 6.

Figure 4:
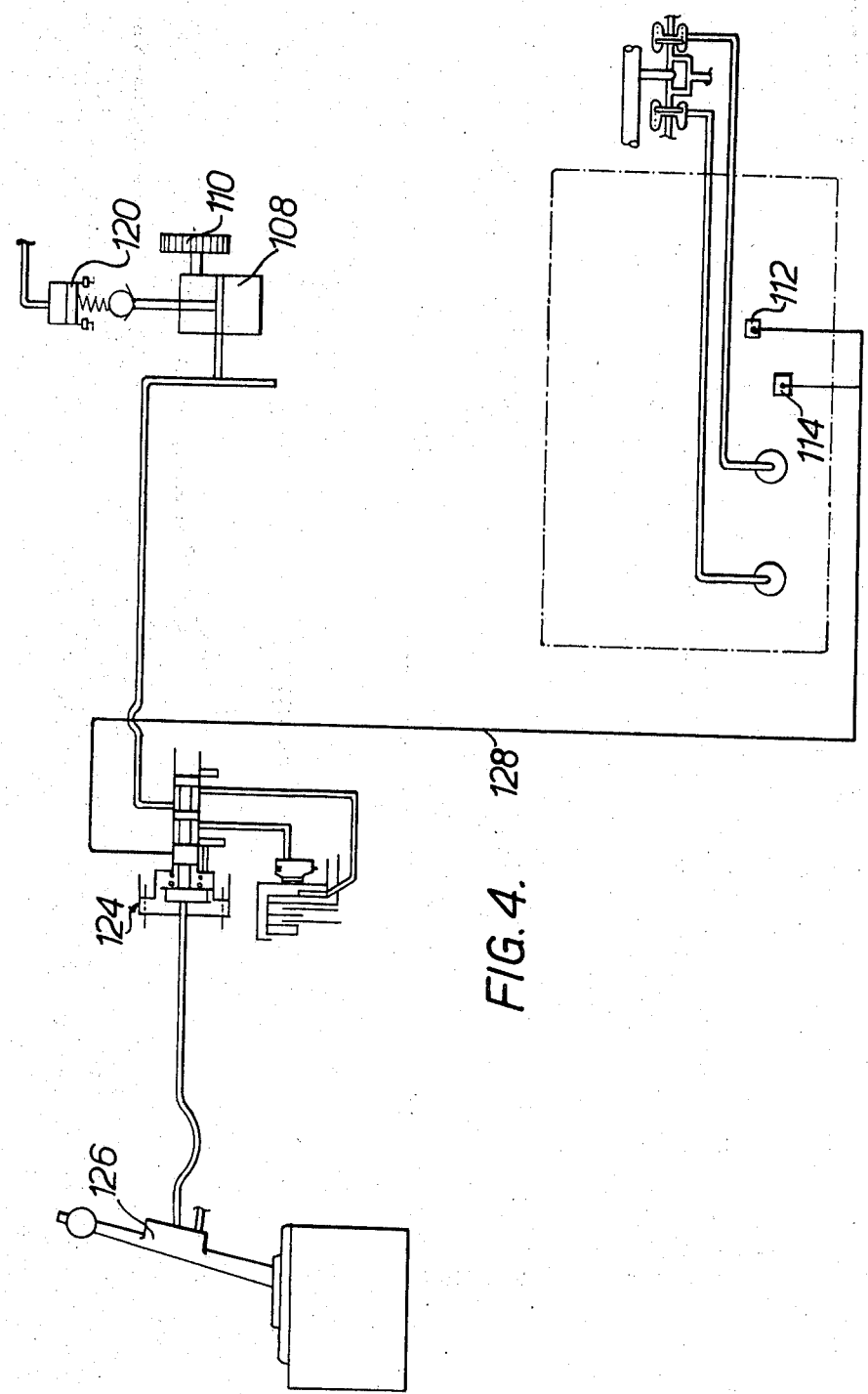
FIG. 4 shows a pressure oil supply derived from a single rotation torque converter.
Figure 5:
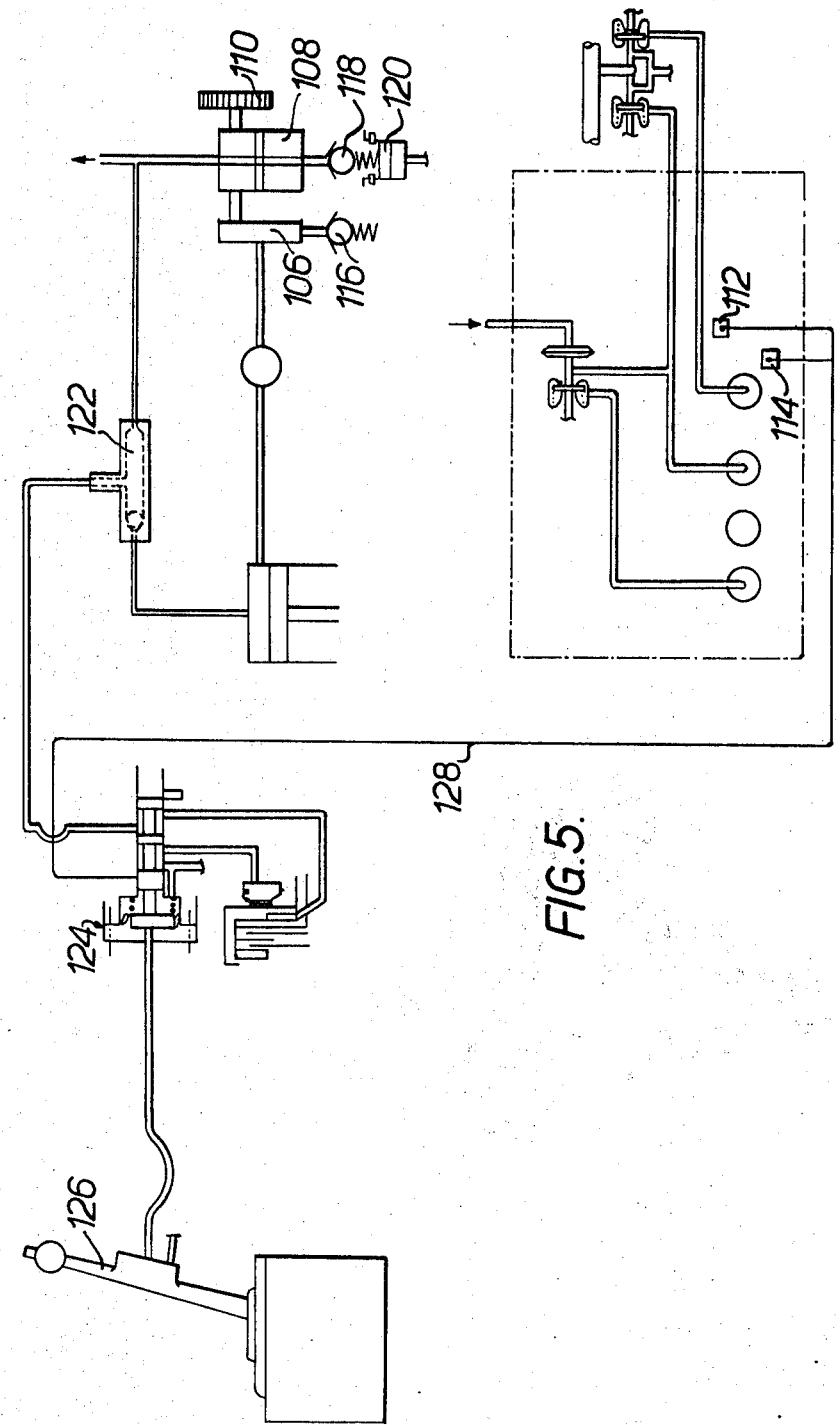
FIG. 5 shows a pressure oil supply from a double rotation torque converter.

The pressure oil groove 94 is supplied with pressure oil from the torque converter feeder fluid system as shown in principle in FIGS. 4 and 5 and as previously mentioned. The variation of the pressure of the pressure fluid in the torque converter, which by means of the normal automatic system of the transmission is varied in a definite relation to the torque multiplication and/or speed ratio, is then utilized to modulate the connection torque and the slip torque of the clutch indicated in FIGS. 6 and 7.

Moreover the clutch, in the high torque multiplication range corresponding to the highest oil pressure should have a specific surface pressure on the plates, which, when the clutch has synchronized, is sufficient to let the so-called "devel effect" increase the friction coefficient over the friction coefficient at the moment of final engagement. To obtain this effect also the clutch linings should preferably be of sintered metal type containing particles of metal carbide. When the clutch is combined with the torque converter, it is always engaged in the case of a stationary vehicle at a relatively low engine speed making the normal friction coefficient sufficient. When once engaged, the increased friction coefficient allows the clutch to carry over the very high peak torque of for instance the DS transmission, whereby a smooth connection and sufficient holding in this range is obtained. When the oil pressure in the higher range is reduced, then the holding capacity is also reduced.

Figure 6:
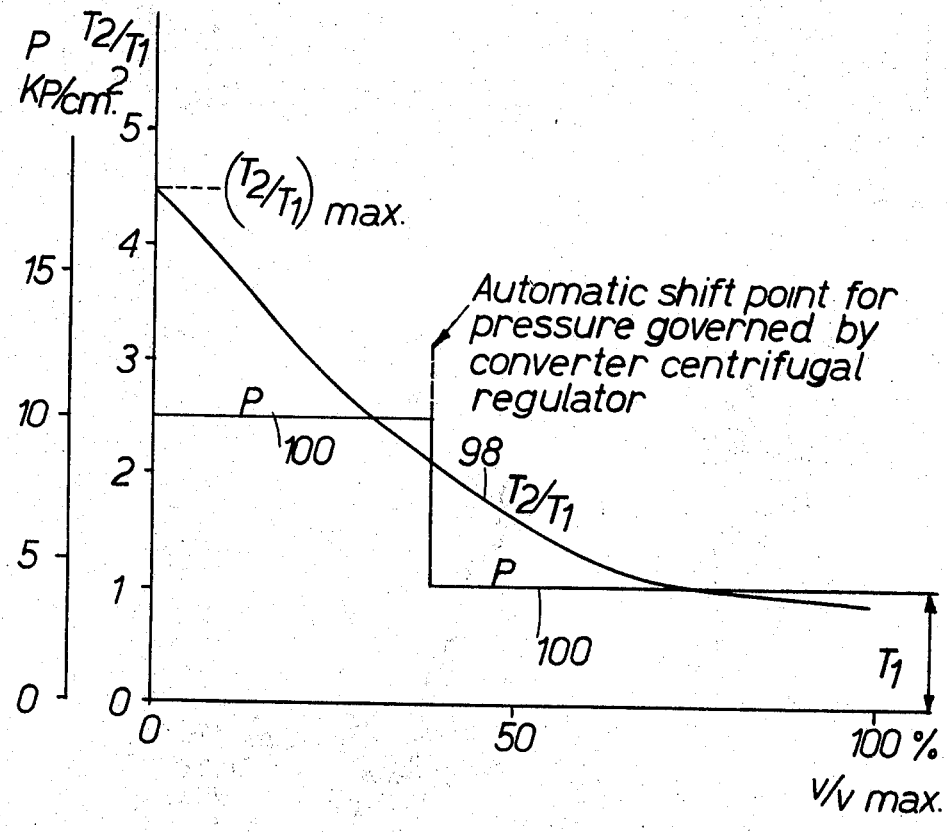
FIG. 6 and FIG. 7 are diagrams showing the relationship between torque multiplication and pressure fluid actuating the friction release clutch for a single rotation transmission and a high torque ratio converter respectively.
Figure 7:
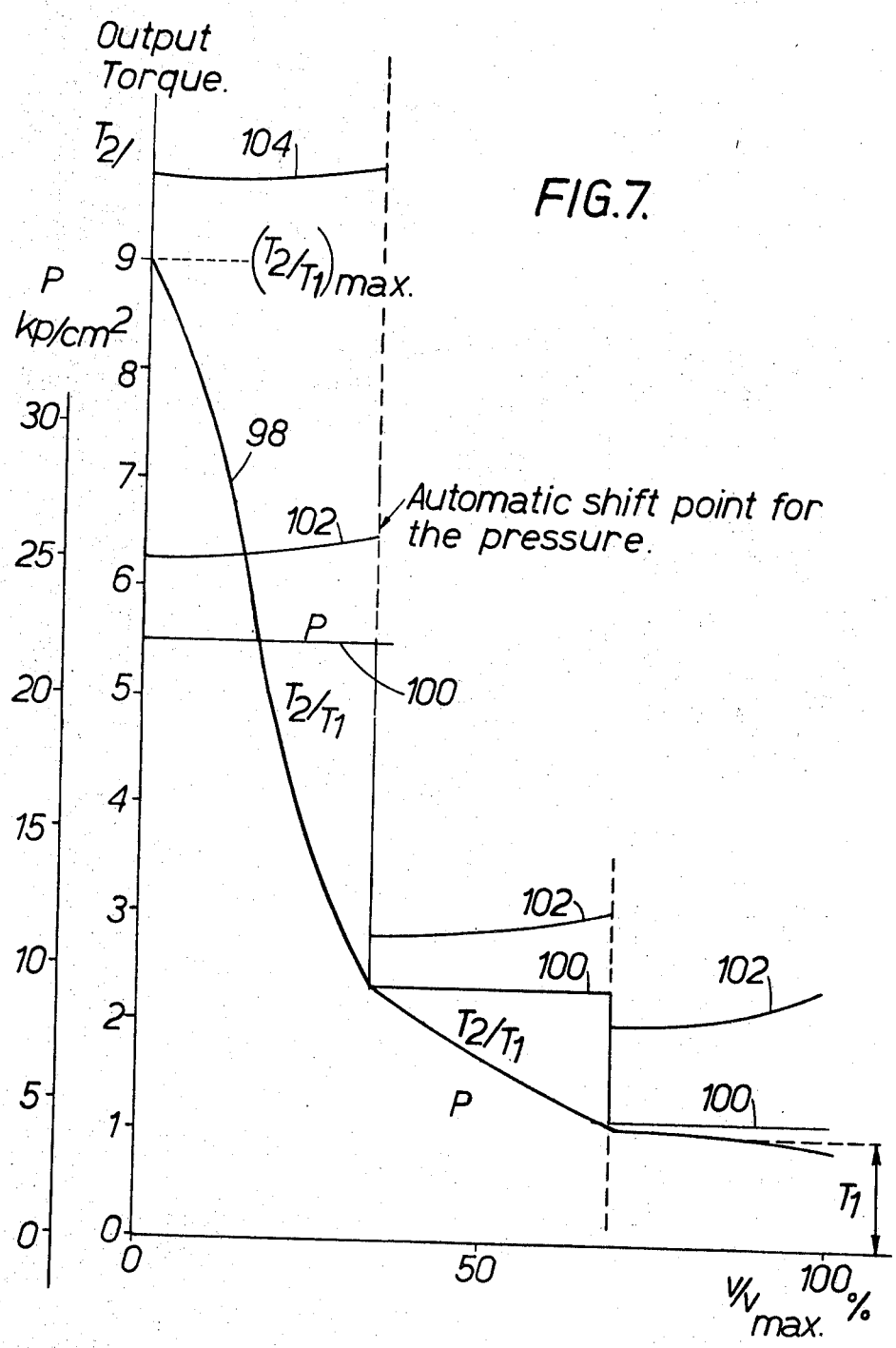

In the diagrams of FIGS. 6 and 7 the line 98 represents, as an example, the output torque in relation to the speed of the vehicle when accelerating to full throttle. The line 100 shows different steps of oil pressure and the line 102 shows the torque limits of the clutch due to basic oil pressure and rotational paraboloid. The difference between 102 and the maximum stall ratio is taken care of by the so-called "devel effect" which produces the slip torque, denoted by the line 104. The torque holding development does not follow the torque in an ideal way, but it can easily be understood that it would be impossible to have the same oil pressure as is necessary to produce the stall torque at full throttle, to connect the clutch at high speed without in this case using a special modulating arrangement. The described clutch however has a sufficiently close relation between the torque to be transmitted and the synchronizing torque to allow soft connections.

The diagrams of FIGS. 4 and 5 show feeder fluid pumps and maximum pressure valves belonging to the two types of torque converters mentioned, producing the pressures mentioned and indicating how this pressure is distributed to the clutch.

FIGS. 4 and 5 also indicate that when the release clutch is released, oil pressure is conveyed to the torque converter positively to release the direct drive. This is necessary to make the connection after freewheeling soft, that is, allowing the clutch only to synchronize the turbine, whereafter the automatic device of the torque converter takes care of the normal engagement of the direct drive. This is not only necessary from the standpoint of soft connection, but also because otherwise the direct drive clutch would slip on the connection of the secondary side release clutch and the wear of both clutches would be much increased due to the elimination of the hydraulic synchronizing of the engine and the turbine speed by torque converter drive before engagement of the direct drive clutch.

In FIG. 5 a high-pressure pump of the torque converter transmission is denoted by 106 and a feeder fluid pump by 108, which pumps are driven by means of the gear 110 from the primary side of the torque converter transmission. 112 indicates on the torque converter transmission a connection to its auto pilot, which when supplied with pressure fluid, ensures disconnection of the lockup clutch of the torque converter transmission. A servomotor 114 is arranged on the auto pilot of the transmission which, when supplied with pressure fluid, ensures that the reactor of the torque converter is rotating freely. A maximum pressure valve of the high-pressure pump is shown at 116 and a maximum pressure valve of the feeder fluid pump at 118.

The basic pressure fluid pressure can be increased in certain operation ranges by a device 120 which is automatically controlled by the auto pilot. A three-way valve is shown at 122 normally being a part of the control valve described in connection with FIG. 3. Devices 124 and 126 are provided for operating said valve which ensures that pressure oil is taken either from a servomotor operated by the high-pressure pump, or from the feeder fluid pump, depending on which is at the higher pressure with the prevailing driving conditions. The pipe 126 conveys pressure fluid from the valve 122 to ensure release of the direct drive clutch and release of the guide vanes of the torque converter transmission.

FIG. 4 shows diagrammatically the same arrangement as FIG. 5 but with the torque converter transmission having no high pressure pump but only a feeder fluid pump and in which the feeder fluid pump pressure can be adjusted to two different levels by the automatic system of the torque converter transmission.

Other features of the release clutch constructed according to the invention, which have been obtained, are fast release; fast and soft connection; and a small output shaft moment of inertia, avoiding the synchronizers of a following synchromesh transmission is the result of the modulated pressure arrangement; and the manner in which the clutch is built up avoiding the normal balance servometer arrangement usually used to eliminate the effect of the rotation paraboloid.

For torque converters of the type described there is one further requirement which in practice is also fulfilled with the clutch described, namely, that the engagement torque of the so-called direct drive clutch shall be capable of holding its engagement without slip during the engaging of the secondary side release clutch, when the transmission is in direct drive. This would be impossible without the special features of the release clutch and its combination with a feeder fluid system of the torque converters as described, if the clutch simultaneously has to be able to hold the stall torque. The invention may be favourably applied to any release clutch in series with a torque converter which has to engage or release before or at the end of the low gear range of a combination of torque and mechanical transmissions with or without power shifts. However this arrangement is especially necessary for the combination of high torque ratio transmission of the type described with a mechanical transmission. The fact that, when the clutch is disengaged, the servomotor for engaging the clutch is emptied from oil and a small space filled with air results in a modulation of the pressure increase, when the clutch is engage again. This small effect of the design according to the invention is also of importance.

I claim:

1. A friction coupling of the type for causing coupling of two members for rotation with each other comprising: friction plates operatively associated with each said member, said friction plates normally being urged out of engagement with each other, a first fluid actuated servomotor mounted for rotation with the friction plates and operable to cause engagement of said friction plates, thereby coupling said members for rotation with each other, means for supplying pressure fluid to the said servomotor to cause said engagement of the friction plates, vent means for releasing pressurized fluid from said first servomotor to permit separation of said friction plates, and a second fluid actuated servomotor, nonrotatably mounted, and separate from the said first fluid actuated servomotor, for positively causing expulsion of and including an axial thrust bearing separating said first and second servomotors.

2. A friction coupling according to claim 1, wherein said rotating servomotor includes a working chamber, and said vent means comprises a vent opening from the working chamber to the exterior of the servomotor for releasing pressure fluid after the coupling has been released, said vent opening being positioned to be covered by the friction plates when the coupling is engaged.

3. A friction coupling according to claim 1 in which said friction plates have a surface lining of sintered material containing hard particles, such that after the friction plates have engaged each other and the input torque is increased, these hard particles break through the film of pressure oil increasing the friction torque.

4. A friction coupling according to claim 1 wherein said friction coupling is mounted on a torque transmitting device, wherein one of said members is the primary side of the device and the other member is the secondary side of the device, and wherein the said servomotor for causing engagement of the friction plates if located on the primary side, the only elements of the coupling mounted on the secondary side for continuous rotation therewith being the friction plates operatively associated with said secondary side.

5. A friction coupling according to claim 1 in which the stationary servomotor includes a working chamber, and a piston located between the working chamber and the axial thrust bearing, and including channels formed in the pistons from the working chamber to the axial thrust bearing for lubrication of the axial thrust bearing.

6. A friction coupling according to claim 5 including distributing grooves formed in the surface of the axial thrust bearing and in communication with said channels to provide a buildup of oil pressure over a substantial area of the surface of the axial thrust bearing.

7. A friction coupling according to claim 1 including a distributing valve having openings to a pressure fluid source, to vent, to the rotating servomotor and to the stationary servomotor, and including a movable valve member, said distributing valve being operable to at least (a) place the source of pressure fluid into fluid communication with the rotating servomotor and concurrently vent the stationary piston, and (b) place the source of pressure fluid in fluid communication with the stationary piston and concurrently vent the rotating servomotor.

8. A friction coupling according to claim 1, in combination with a torque converter transmission having at least one source of pressure fluid, and wherein the said means for supplying pressure fluid to the servomotors is in fluid communication with the said pressure source of the torque converter transmission.

9. A combination according to claim 8 including a valve permitting flow of pressure fluid to the stationary servomotor to cause release of the friction plates and concurrently permitting fluid flow to a further servomotor on the torque converter transmission acting to disconnect the direct drive clutch of the torque converter transmission positively as long as the friction plates are released.

10. A combination according to claim 9, wherein the said valve is a three-way valve having two intakes, the valve and the intakes being arranged such that pressure fluid is delivered from the intake at the highest pressure.

11. A combination according to claim 10, in which one of the pressure fluid intakes is connected to a high-pressure pump of the torque converter transmission and the other is connected to the feeder fluid pump system of the torque converter transmission.

12. A combination according to claim 9, including means for delaying a drop in pressure in the said further servomotor so that when the friction plates are again engaged, the direct drive clutch of the torque converter is prevented from becoming engaged prior to the engagement of said friction plates.

13. A combination according to claim 8, wherein when the friction plates are released, pressure fluid from the valve actuates a further servomotor on the torque converter transmission releasing the reaction member thereof to allow it to rotate freely.

14. A combination according to claim 13, wherein the said valve is three-way valve having two intakes, the valve and the intakes being arranged such that pressure fluid is delivered from the intake at the highest pressure.

15. A combination according to claim 14, in which one of the pressure fluid intake s is connected to a high-pressure pump of the torque converter transmission and the other is connected to the feeder fluid pump system of the torque converter transmission.

16. A friction coupling according to claim 1, combined with a torque converter transmission having pressurized oil therein and means for automatically controlling the pressure according to the torque multiplication of the transmission such that with high torque multiplication the oil pressure is high and with little torque multiplication the oil pressure is correspondingly lower.

17. A friction coupling according to claim 1, in combination with a torque converter transmission having a plurality of sources of pressure fluid at different pressures, and wherein said means for supplying pressure fluid is operable to supply any one of said sources of pressure fluid of the torque converter to operate the servomotors.

18. A friction coupling according to claim 7, wherein said valve is a three-way valve having two intakes, the valve and the intakes being arranged such that pressure fluid is delivered from the intake at the highest pressure.